US006594210B2

(12) United States Patent
Kumagai

(10) Patent No.: US 6,594,210 B2
(45) Date of Patent: Jul. 15, 2003

(54) DISC DRIVE APPARATUS AND METHOD FOR GENERATING WOBBLE INFORMATION

(75) Inventor: Eiji Kumagai, Kanagawa (JP)

(73) Assignee: Sony Corporation (JP)

( * ) Notice: Subject to any disclaimer, the term of this patent is extended or adjusted under 35 U.S.C. 154(b) by 138 days.

(21) Appl. No.: 09/812,856

(22) Filed: Mar. 21, 2001

(65) Prior Publication Data

US 2002/0018411 A1 Feb. 14, 2002

(30) Foreign Application Priority Data

Mar. 21, 2000 (JP) ........................................ 2000-083245
Jun. 5, 2000 (JP) ........................................ 2000-167650

(51) Int. Cl.[7] .............................................. G11B 5/09
(52) U.S. Cl. ................................ 369/47.17; 369/53.33; 369/124.03
(58) Field of Search ...................... 369/44.13, 44.32, 369/44.37, 44.41, 47.17, 53.12, 53.13, 53.14, 53.33, 53.42, 53.44, 124.02, 124.03, 275.4

(56) References Cited

U.S. PATENT DOCUMENTS 5,844,882 A * 12/1998 Yoshida et al. .......... 369/275.4
6,320,831 B1 * 11/2001 Inoue et al. ............. 369/47.22

* cited by examiner

*Primary Examiner*—Paul W. Huber
(74) *Attorney, Agent, or Firm*—Rader, Fishman & Grauer PLLC; Ronald P. Kananen, Esq.

(57) ABSTRACT

An optical disc is irradiated with a main beam and a pair of side beams, and respected reflected beams of light are detected by a main detector and a pair of side detectors. A first push-pull signal is generated which includes wobble components obtained by a detection signal from the main detector, and second and third push-pull signals are generated using detection signals from the pair of side detectors. The second and third push-pull signals are added by an adder to generate crosstalk components included in the first push-pull signal, and wobble information of the recording track is generated and output using signals obtained by canceling the crosstalk components in the first push-pull signal including wobble signal components in the recording track.

21 Claims, 9 Drawing Sheets

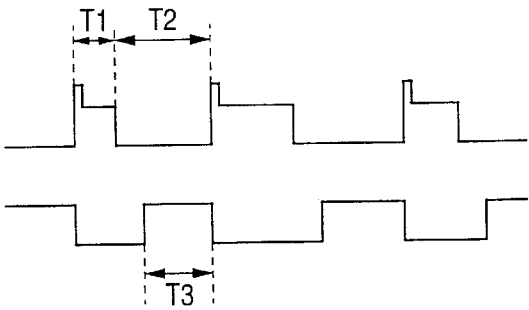
FIG. 3A WRITE POWER
FIG. 3B SAMPLE PULSE
H = SAMPLE
L = HOLD
FIG. 4
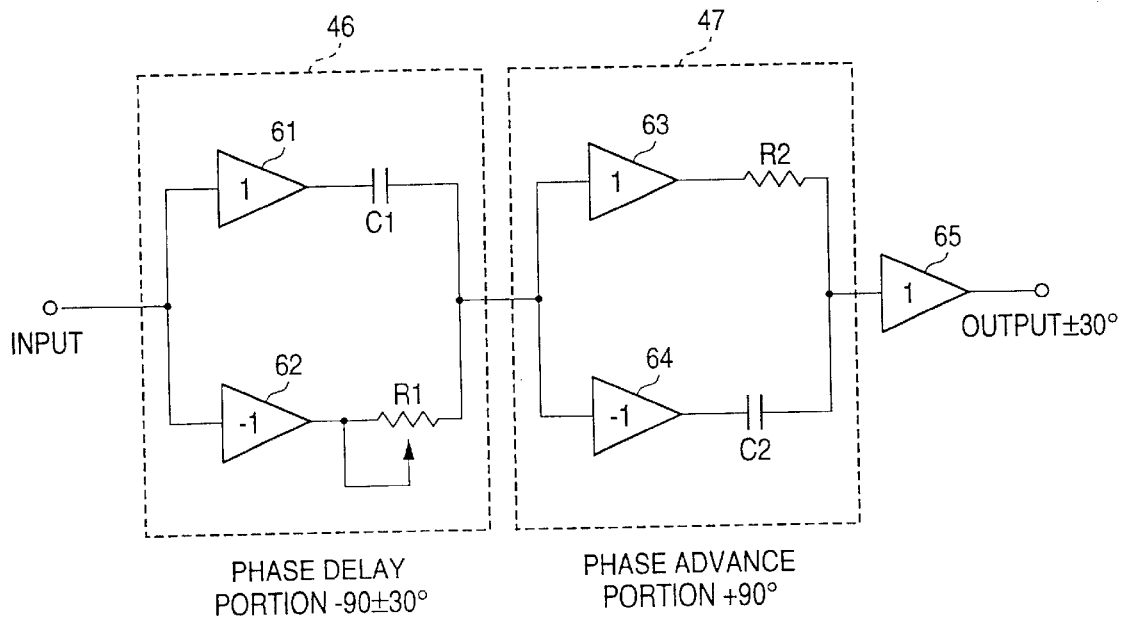

FIG. 6A
STANDARD DISC
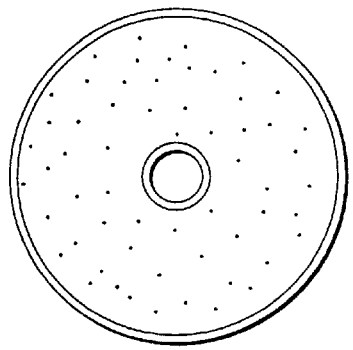
FIG. 6B
HIGH DENSITY DISC
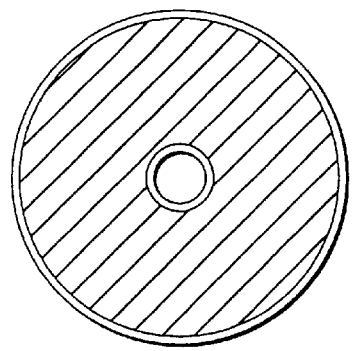
FIG. 6C
HYBRID DISC
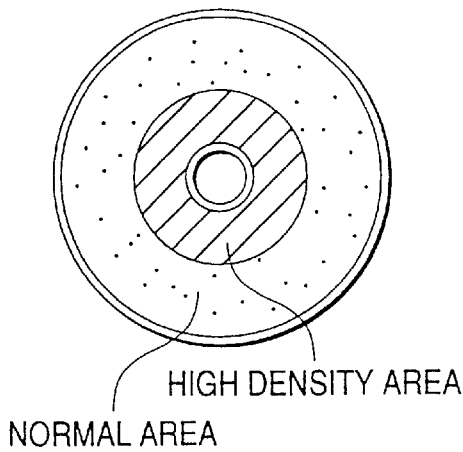
HIGH DENSITY AREA
NORMAL AREA
FIG. 6D
HYBRID DISC
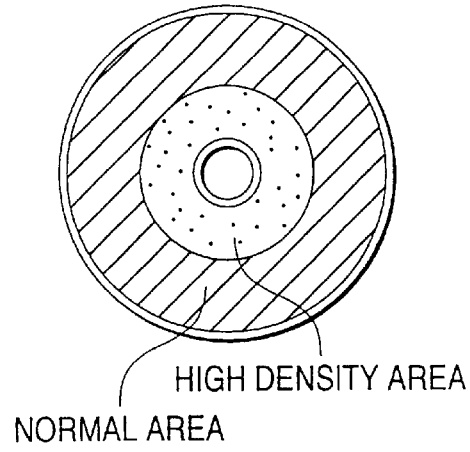
HIGH DENSITY AREA
NORMAL AREA
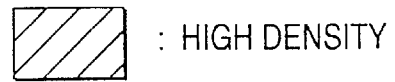 : HIGH DENSITY
 : NORMAL DENSITY

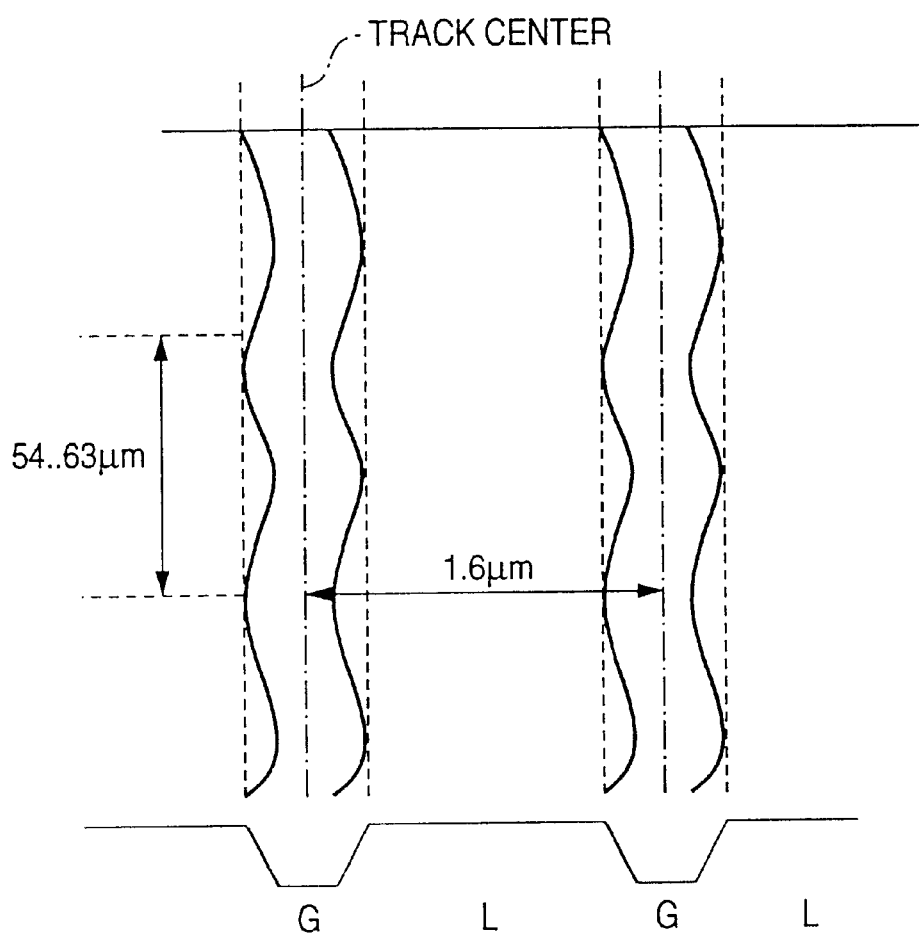

DISC DRIVE APPARATUS AND METHOD FOR GENERATING WOBBLE INFORMATION

BACKGROUND OF THE INVENTION

1. Field of the Invention

The present invention relates to a disc drive apparatus and a method for generating wobble information suitable for recording or reproduction of a disc recording medium on which recording tracks are formed, for example, in the form of grooves.

2. Description of the Related Art

A variety of discs, e.g., CDs-R (compact discs-recordable), CDs-RW (CDs-rewritable) and MDs (mini discs) have been developed and have spread as disc recording media.

In such CDS-R, CDs-RW and MDs, recording tracks are formed using grooves (guide grooves), and such grooves are wobbled to control the recording positions and the rotation of a spindle.

For example, such wobbles are formed based on frequency-modulated (FSK-modulated) signals according to information such as absolute addresses.

It is therefore possible to determine an address by extracting wobble information such as an absolute address from the groove.

For example, wobble information is extracted by an RF amplifier which generates necessary signals such as RF signals that are reproduction data, focus error signals FE and tracking error signals TE for servo control based on information of reflected light from spots of light projected upon a disc by a pickup.

The configuration of the RF amplifier depends on the method for controlling tracking of optical spots. For example, the well-known 3-spot method, push-pull system, DPP (differential push-pull) system and the like necessitate different configurations.

A method for generating wobble information in a conventional RF amplifier will now be described.

By way of example, a description will now be made on a method for generating wobble information in an RF amplifier which employs the DPP system as a tracking servo controlling system.

FIG. 9 shows a configuration of a DPP type RF processing circuit provided in a conventional disc drive apparatus.

In a disc drive apparatus in which tracking control is performed using a DPP system, a pickup generates a main spot for scanning a recording track and two side spots which are separate from the main spot.

Therefore, the pickup as a photo-detector 105 is provided with a main detector 151 that detects information of reflected light from the main spot and two side detectors 152 and 153 for detecting information of reflected light from the two side spots, respectively.

Referring to the actual locations of the detectors of the photo-detector 105, the side detectors 152 and 153 are respectively provided in front of and behind the main detector 151 in the direction of a track. In FIG. 9, however, the side detectors 152 and 153 are shown side by side for better understanding of the circuit configuration.

The main detector 151 is divided by a division line in a direction orthogonal to a track formed on a disc and a division line in parallel with the track into four detection areas A, B, C and D, and information of reflected light from the recording track is detected by the detection areas A, B, C and D. Pieces of information on reflected light detected by the detection areas A through D are converted by respective photoelectric conversion portions 154a, 154b, 154c and 154d into electrical signals A, B, C and D depending on quantities of reflected light and are output to the RF processing circuit.

In the present specification, the electrical signals detected by the detection areas A through D and converted by the photoelectric conversion portions 154a through 154d are referred to as "detection signals A through D", respectively.

The detection signals A through D from the respective photoelectric conversion portions 154a through 154d are output to an adder 131 and a main sample-and-hold circuit 132 provided in the RF processing circuit.

The adder 131 adds the detection signals A through D from the respective photoelectric conversion portions 154a through 154d and outputs a resultant sum signal (A+B+C+D) as an RF signal or reproduction data signal.

For example, the main sample-and-hold circuit 132 samples and holds the detection signals A through D based on sample pulses input thereto during data recording and allows the detection signals A through D to pass through as they are without sampling and holding them in any other occasion.

A main matrix calculation/amplification circuit (main matrix amplifier) 133 performs various arithmetic processes for obtaining, for example, tracking error signals TE, focus error signals FE, wobble information WOB and the like from the signals A through D output by the main sample-and-hold circuit 132.

For example, it performs an arithmetic process (A+D)−(B+C) to obtain a tracking error signal TE and wobble information WOB before and during recording of data in a recording track and outputs the result of calculation as a main push-pull signal MPP.

Further, it performs an arithmetic process (A+C)−(B+D) to obtain a focus error signal FE.

For example, the main matrix amplifier 133 performs arithmetic processes (A+D) and (B+C) to obtain wobble information WOB after recording of data in a recording track and outputs the arithmetic outputs to AGC (automatic gain control) circuits 134a and 134b, respectively.

The AGC circuits 134a and 134b perform gain adjustment such that the amplitude levels of the arithmetic outputs (A+D) and (B+C) from the main matrix amplifier 133 become equal to each other and provides the output to a differential amplifier 135.

The differential amplifier 135 outputs the difference between the output signal (A+D) from the AGC circuit 134a and the output signal (B+C) from the AGC circuit 134b as (A+D)−(B+C). Therefore, the differential amplifier 135 outputs a push-pull signal whose gain has been adjusted by the AGC circuits 134a and 134b.

Switching of a switch 136 is controlled depending on the operating state of the disc drive apparatus.

For example, the switch is controlled such that it is switched between a position after recording of data and a position before and during recording of data, and the output of the differential amplifier 135 is output to a band-pass filter (BPF) 137 after recording of data. Before and during recording of data, the main push-pull signal MPP from the main matrix amplifier 133 is output to the BPF 137.

The BPF 137 is a band-pass filter that allows wobble components having a central frequency of 22.05 kHz to pass through to eliminate other unnecessary frequency components. It extracts wobble components included in the push-pull signal input through the switch 136 to output wobble information WOB.

The side detectors 152 and 153 are divided into two detection areas E and F and G and H respectively by division lines in parallel with the track formed on the disc. Pieces of information of reflected light detected by the detection areas E through H are converted by photoelectric conversion portions 154e, 154f, 154g and 154h into respective output signals E, F, G and H which are in turn output to a side sample-and-hold circuit 138 of the RF amplifier.

In this case, the electrical signals detected by the detection areas E through H and converted by the photoelectric conversion portions 154e through 154h are referred to as "detection signals E through H", respectively.

The side sample-and-hold circuit 138 receives the input of sample pulses similarly to the above-described main sample-and-hold circuit 132. For example, it samples and holds the detection signals E through H based on the sample pulses during recording of data and allows the detection signals E through H to pass through without sampling and holding them in any other occasion.

A side matrix amplifier 139 performs an arithmetic process (F+H)−(E+G) to obtain a tracking error signal TE from the output signals E through H of the side sample-and-hold circuit 138 and outputs the arithmetic result to a differential amplifier 140 as a side push-pull signal SPP.

The differential amplifier 140 obtains a differential signal (MPP-SPP) from the main push-pull signal MPP from the main matrix amplifier 133 and the side push-pull signal SPP from the side matrix amplifier 139 and outputs the same as a tracking error signal TE.

To satisfy demands for recording media having greater capacities, discs in the CD format having great capacities (e.g., discs having a capacity that is twice the capacity of existing CDs) have recently been developed by increasing recording density.

For convenience in description, such discs will be referred to as "high density discs", and discs in the CD format having conventional capacities will be referred to as "standard discs".

However, when it is attempted to extract wobble information from a high density disc in a disc drive apparatus employing the DPP system as described above that requires three spots, a problem arises in that the configuration of the optical system becomes complicated because changes must be made in the central frequency of laser light output by the laser light source provided in the pickup, the numerical aperture NA of the objective lens and so on.

Further, for example, when the density of tracks on a disc is increased without changing the specification of the optical system, crosstalk between adjoining tracks will create problems as described below.

FIGS. 10A and 10B show the relationship between spots of laser light emitted by a disc drive apparatus and track pitches. While FIGS. 10A and 10B show grooves G for recording tracks as being substantially straight, the grooves are wobbled in practice.

By way of example, FIG. 10A shows the relationship between laser spots and a track pitch of 1.6 μm of a standard disc.

By way of example, FIG. 10B shows the relationship between laser spots and a track pitch of 1.1 μm of a high density disc.

A comparison between the standard disc shown in FIG. 10A and the high density disc shown in FIG. 10B indicates that the track pitch of the high density disc is similar to or smaller than the diameter of a laser spot SPm.

Therefore, the high density disc is more vulnerable to crosstalk between adjoining tracks than the standard disc.

Especially when the grooves G are wobbled to record address information or the like using FSK modulation, the effect of crosstalk disturbs the phases of FSK-modulated signals, and resultant jitter components cause problems in that they disable reading of the address information and in that they make the spindle motor unstable.

SUMMARY OF THE INVENTION

The present invention has been conceived taking such problems into consideration. According to the invention, there is provided a disc drive apparatus capable of recording or reproducing a disc recording medium on which recording tracks are formed using grooves, which has light detecting means capable of obtaining a first push-pull signal from reflected light from a main spot of laser light and obtaining second and third push-pull signals from reflected light from two side spots of the laser light, a wobble signal component extractor for extracting wobble signal components in a recording track under a scan using the first push-pull signal, a crosstalk component signal generator for generating crosstalk component signals from adjacent tracks on both sides of the recording track using the second and third push-pull signals and a wobble information output unit for generating wobble information of the recording track from signals obtained by canceling the crosstalk component signals in the wobble signal components and for outputting the wobble information.

According to the invention, there is provided a method for generating wobble information from a disc recording medium on which recording tracks are formed using grooves, wherein wobble component signals in a recording track under a scan are extracted using a first push-pull signal obtained from reflected light from a main spot of laser light; and crosstalk component signals are generated from adjacent tracks on both sides of the recording track using second and third push-pull signals obtained from reflected light from two side spots of the laser light. Wobble information of the recording track is generated from signals obtained by canceling the crosstalk component signals in the wobble component signals.

According to the invention, crosstalk components generated by the second and third push-pull signals obtained from reflected light from two side spots of laser light are eliminated from the first push-pull signal including wobble components obtained from reflected light from a main spot. This makes it possible to reduce jitter components included in wobble information even when the wobble information is generated from a high density disc, for example.

BRIEF DESCRIPTION OF THE DRAWINGS

FIG. 3, consisting of FIGS. 3A and 3B, is a diagram shoeing the timing operation of a sample-and-hold circuit.

FIG. 4 illustrates an example of a phase shift circuit.

FIGS. 6A through 6D illustrate the types of discs that are embodiments of the invention.

FIG. 7 illustrates wobbling grooves.

DETAILED DESCRIPTION OF THE PREFERRED EMBODIMENT

A description will now be made on a configuration of a disc drive apparatus that is an embodiment of the invention.

Figure 1:
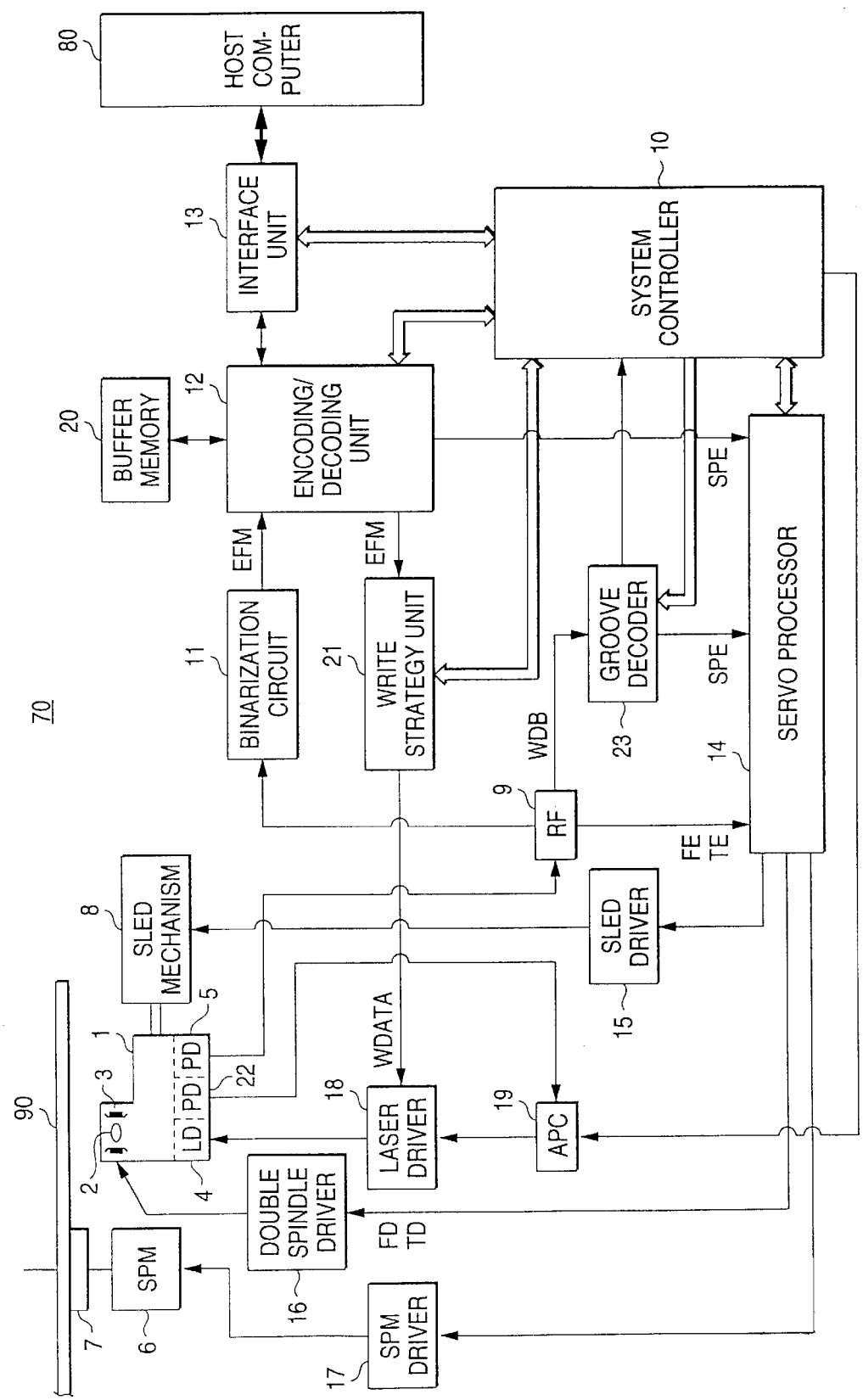
FIG. 1 is a block diagram of a disc drive apparatus that is an embodiment of the invention.

FIG. 1 is a diagram showing a configuration of the disc drive apparatus that is an embodiment of the invention.

In FIG. 1, a disc 90 is a disc in the CD format such as a CD-R, CD-RW, CD-DA or CD-ROM.

The disc 90 is placed on a turntable 7 and, during recording and reproducing operations, it is driven by a spindle motor 6 for rotation at a constant linear velocity (CLV) or constant angular velocity (CAV). A pickup 1 reads pit data on the disc 90. The pits are formed utilizing phase changes in the case of a CD-RW. The pits are formed utilizing changes of an organic coloring matter (changes in reflectivity) in the case of a CD-R. The pits are emboss bits in the case of a CD-DA, CD-ROM or the like.

In the pickup 1, there is formed a laser diode 4 that serves as a laser light source, a photo-detector 5 for detecting reflected light, an objective lens 2 that serves as a laser light output end and an optical system (not shown) for a recording surface of a disc with laser light through the objective lens 2 and for guiding resultant reflected light to the photo-detector 5. Although not shown, the optical system is provided with a diffraction grating for diffracting light emitted by the laser diode 4 into at least three beams of light, i.e., zero-order light, positive first-order light and negative first-order light.

There is also provided a monitoring detector 22 for receiving a part of the light output by the laser diode 4.

The objective lens 2 is held by a double spindle mechanism 3 such that it can be moved in a tracking direction and a focusing direction.

The pickup 1 as a whole can be moved by a sled mechanism 8 in the radial direction of the disc.

The laser diode 4 of the pickup 1 is driven for laser emission by a drive signal (drive current) from a laser driver 18.

Information in the form of reflected light from the disc 90 is detected by the photo-detector 5 and converted into an electrical signal in accordance with the quantity of the received light, the signal being supplied to an RF processing circuit 9.

In general, the RF processing circuit 9 is loaded with an AGC circuit for reasons including the fact that light is reflected from the disc 90 in significantly different quantities before, after and during data recording unlike the case of a CD-ROM and the fact that the reflectivity of a CD-RW itself is greatly different from that of a CD-ROM or CD-R.

The configuration of the RF processing circuit 9 will be described later. The RF processing circuit 9 has a current-to-voltage conversion circuit, a matrix calculation/amplification circuit and the like associated with output currents from a plurality of light-receiving elements as the photo-detector 5. It generates necessary signals through a matrix calculation process. For example, it generates an RF signal as reproduction data, a focus error signal FE and a tracking error signal TE for servo control and so on.

The reproduction RF signal output by the RF processing circuit 9 is supplied to a binarization circuit 11, and the focus error signal FE and tracking error signal TE are supplied to a servo processor 14.

As described above, grooves to serve guides for recording tracks are formed on the disc 90 as a CD-R or CD-RW in advance, and the grooves are wobbled by signals which are obtained by modulating time information indicating absolute addresses on the disc. Therefore, tracking servo can be activated from the information of the grooves during recording and reproducing operations, and absolute addresses and various physical information can be obtained as wobble information of the grooves. The RF processing circuit 9 extracts wobble information WOB through a matrix calculation process and supplies the same to a groove decoder 23.

While there are CDS-R and CDS-RW having a normal density and a high density, the RF processing circuit 9 is adapted to switch methods for generating wobble information depending on a density type advised by a system controller 10 as will be described later.

The groove decoder 23 decodes wobble information WOB supplied thereto to obtain absolute address information and supplies the information to the system controller 10.

A spindle error signal SPE can be generated from wobble information.

Since it is desirable to accommodate CDs-R and CDs-RW having a normal density and a high density, the groove decoder 23 switches decoding systems depending on a density type advised by the system controller 10. Specifically, it switches matching patterns for frame synchronization.

A reproduction RF signal obtained by the RF processing circuit 9 is binarized by the binarization circuit 11 to provide a so-called EFM signal (8-14 modulation signal) which is in turn supplied to an encoding/decoding unit 12.

The encoding/decoding unit 12 has a portion to serve as a decoder during reproduction and a portion to serve as an encoder during recording.

During reproduction, it performs processes such as EFM demodulation, CIRC error correction, deinterleaving and CD-ROM decoding to obtain reproduction data that have been converted into data in the CD-ROM format.

The encoding/decoding unit 12 also performs a process of extracting sub-codes from data read from the disc 90 and supplies a TOC, address information and so on as sub-codes (Q-data) to the system controller 10.

Further, the encoding/decoding unit 12 performs a PLL process to generate a reproduction clock that is in synchronism with the EFM signal and performs the above-described decoding process based on the reproduction clock. It can generate and output the spindle error signal SPE by obtaining information on the rotating speed of the spindle motor 6 from the reproduction clock and comparing the same with information on a reference speed.

The processing method of the encoding/decoding unit 12 is switched depending on the density (a normal or high density) of the disc (or unit area) under recording or reproduction.

During reproduction, the encoding/decoding unit 12 accumulates data that have been decoded as described above in a buffer memory 20.

Referring to reproduction output from the disc drive apparatus, data buffered in the buffer memory 20 are read and transferred.

An interface unit 13 is connected to an external host computer 80 to allow communication of recorded data, reproduction data and various commands to and from the host computer 80. In practice, an SCSI interface, an ATAPI interface or the like is used. During reproduction, reproduction data which have been decoded and stored in the buffer memory 20 are transferred and output to the host computer 80 through the interface unit 13.

Signals such as a read command and write command from the host computer 80 are supplied to the system controller 10 through the interface unit 13.

During reproduction, recorded data (audio data or CD-ROM data) are transferred from the host computer 80, and the recorded data are transferred from the interface unit 13 to the buffer memory 20 to be buffered therein.

In this case, the encoding/decoding unit 12 performs processes for encoding the recorded data that have been buffered, the processes including a process of encoding data in the CD-ROM format into data in the CD format (when the supplied data are CD-ROM data), CIRC encoding and interleaving, addition of sub-codes and EFM modulation.

An EFM signal obtained as a result of the encoding process at the encoding/decoding unit 12 are subjected to a waveform adjusting process at a write strategy unit 21 and sent to the laser driver 18 as laser drive pulses (write data WDATA).

The write strategy unit 21 performs compensation for recording such as fine adjustment of optimum recording power and adjustment of the waveform of the laser drive pulses in accordance with the characteristics of the recording layer, the shapes of spots of laser light, the recording linear velocity and so on.

The laser driver 18 supplies the laser driver pulses supplied thereto as write data WDATA to the laser diode 4 to drive the same for laser emission. As a result, pits in accordance with the EFM signal (pits formed as a result of phase changes and changes in a coloring matter) are formed on the disc 90.

An APC (automatic power control) circuit 19 is a circuit unit for controlling the laser output power to make the laser output constant without being effected by the temperature while monitoring the same from the output of the monitoring detector 22. A target value for the laser output is supplied by the system controller 10, and the laser driver 18 is controlled such that the laser output level coincides with the target value.

The servo processor 14 performs a servo operation by generating various servo drive signals such as focus, tracking, sled and spindle servo drive signals from the focus error signal FE and tracking error signal TE from the RF processing circuit 9, the spindle error signal SPE from the encoding/decoding unit 12 or groove decoder 23 and so on.

Specifically, it generates a focus drive signal FD and a tracking drive signal TD according to the focus error signal FE and tracking error signal TE and supplies them to a double spindle driver 16. The double spindle driver 16 drives a focus coil and a tracking coil of the double spindle mechanism 3 of the pickup 1. As a result, a tracking servo loop and a focus servo loop are formed by the pickup 1, RF processing circuit 9, servo processor 14, double spindle driver 16 and double spindle mechanism 3.

The tracking servo loop is turned off in accordance with a track jump command from the system controller 10, and a track jump operation is performed by outputting a jump drive signal to the double spindle driver 16.

The servo processor 14 supplies a spindle motor driver 17 with a spindle drive signal generated according to the spindle error signal SPE. For example, the spindle motor driver 17 applies a three-phase drive signal to the spindle motor 6 according to the spindle drive signal to cause CLV rotation or CAV rotation of the spindle motor 6. The servo processor 14 generates a spindle drive signal in accordance with a spindle kick/brake control signal from the system controller 10 to cause operations of the spindle motor driver 17 such as activation, stopping, acceleration and deceleration of the spindle motor 6.

The servo processor 14 generates a sled drive signal based on, for example, a sled error signal obtained as a low frequency component of the tracking error signal TE and access control performed by the system controller 10 and supplies the same to a sled driver 15. The sled driver 15 drives the sled mechanism 8 according to the sled drive signal. Although not shown, the sled mechanism 8 has a mechanism formed by a main shaft for holding the pickup 1, a sled motor and a transmission gear. The sled driver 15 drives the sled motor 8 according to the sled drive signal to cause a required sliding motion of the pickup 1.

Various operations of the servo system and recording/reproducing system as described above are controlled by the system controller 10 that is constituted by a microcomputer.

The system controller 10 executes various processes according to commands from the host computer 80.

For example, when the host computer 80 supplies a read command that requests transfer of a certain item of data recorded on the disc 90, seek operation control is first performed to reach the specified address. Specifically, a command is supplied to the servo processor 14 to cause the pickup 1 to perform an operation of accessing an address specified by a seek command.

Thereafter, operation control is carried out to transfer data in the specified data section to the computer 80. Specifically, data in the disc 90 are read, decoded and buffered, and the requested data are transferred.

When a write command is issued from the host computer 80, the system controller 10 first moves the pickup 1 to the address where writing is to be performed. The encoding/decoding unit 12 then performs the encoding process as described above on data transferred from the host computer 80 to provide an EFM signal.

Then, the write data WDATA are supplied from the write strategy unit 21 to the laser driver 18 to perform recording.

While the example in FIG. 1 is a disc drive apparatus 70 connected to a host computer 80, a disc drive apparatus to serve as a recording apparatus or reproducing apparatus according to the invention may be a type that is not connected to the host computer 80 or the like, e.g., an audio CD player or CD recorder. In such a case, an operating unit and a display unit may be provided, and the configuration of the interface unit for inputting and outputting data may be different from that shown in FIG. 1. Specifically, what is required is that recording and reproduction is performed according to operations of a user and that a terminal unit for inputting and outputting audio data is formed. A configuration may be employed in which the track number (absolute address or relative address) and time for recording or reproduction are displayed on a display unit.

Obviously, there are various other possible configurations and, for example, an apparatus used only for recording or reproduction may be configured.

A description will now be made with reference to FIGS. 6A through 8 on various types of discs on which recording and reproduction can be performed using the above-described disc drive apparatus.

FIGS. 6A through 6D are illustrations showing examples of disc types in the CD format on which recording and reproduction can be performed using the disc drive apparatus that is an embodiment of the invention.

FIG. 6A shows a standard disc having a conventional recording density on the entire region thereof. CDs-R, CDs-RW that have been widely spread fall under the same category.

FIG. 6B shows a high density disc which is under active development in recent years, and the example shows a disc type in which high density recording is performed on the entire region thereof. For example, discs having density that is twice or three times that of a standard disc have been developed.

FIGS. 6C and 6D show hybrid discs which are divided into a region having a normal density and a region having a high density located close to the inner circumference and outer circumference thereof respectively (or located oppositely).

For example, when the standard disc and high density disc shown in FIGS. 6A and 6B are used, the disc drive apparatus must determine the type of the disc when the disc is loaded.

In the case of the hybrid disc shown in FIG. 6C or 6D, the disc drive apparatus must determine the type of the area that is currently under recording or reproduction, i.e., whether it is a high density area or standard density area.

In general, a CD type disc as described above has a single spiral recording track that starts at the center (inner circumference) of the disc and ends at the edge (outer circumference) of the disc.

In the case of a disc such as a CD-R or CD-RW on which a user can record data, only guide grooves for guiding laser light are formed as recording tracks on the substrate prior to recording. The grooves are irradiated with laser light which have been subjected to data modulation at high power to change the reflectivity or phase of the recording film, and data are recorded based on such a principle.

A CD-R is formed with a recording film on which recording can be performed only once. The recording film is an organic coloring matter, and recording is performed by punching the same using a high power laser.

In the case of a CD-RW formed with a recording film that accepts writing plural times, the recording system is the phase change recording in which data are recorded as a difference in reflectivity between a crystalline state and an amorphous state of the film.

Referring to physical characteristics, reproduction-only CDs and CDS-R have reflectivity of 0.7 or more, and CDs-RW have reflectivity of about 0.2. Therefore, a CD-RW can not be reproduced as it is on a reproduction apparatus that is designed to achieve target reflectivity of 0.7 or more. For this reason, reproduction is performed by adding an AGC (automatic gain control) function for amplifying weak signals.

In the case of a CD-R or CD-RW, in order to control the recording position and the rotation of the spindle, grooves (guide grooves) for forming data tracks are wobbled, The wobbles are formed based on signals modulated based on information of absolute addresses or the like and, therefore, they include information of the absolute addresses or the like. That is, wobble information such as absolute addresses can be read from the grooves.

Information of absolute time (address) represented by such wobbled grooves is referred to as "ATIP (absolute time in pregroove)".

As shown in FIG. 7, wobbling grooves are slightly wobbled in the form of sine waves. They have a central frequency of 22.05 kHz, and the quantity of wobbling is about ±0.03 µm.

A description will now be made on wobble information represented by wobbling grooves.

Referring to wobble information detected from the grooves of a CD-R or CD-RW through a push-pull channel, when the rotation of the spindle motor is controlled such that the central frequency of 22.05 kHz is achieved with the disc rotated at a normal speed, the spindle is rotated just at a linear velocity defined for the CD system (e.g., a velocity in the range from 1.2 m/s to 1.4 m/s in the case of the normal density).

While a CD-DA or CD-ROM relies upon absolute time information encoded in sub-codes Q, an unrecorded CD-R or CD-RW (blank disc) from which such information is not available relies upon absolute time information included in wobble information.

One sector (ATIP sector) as wobble information corresponds to one data sector (2352 bytes) of the main channel after recording, and writing is performed while synchronizing the ATIP sector and data sector.

Figure 8:
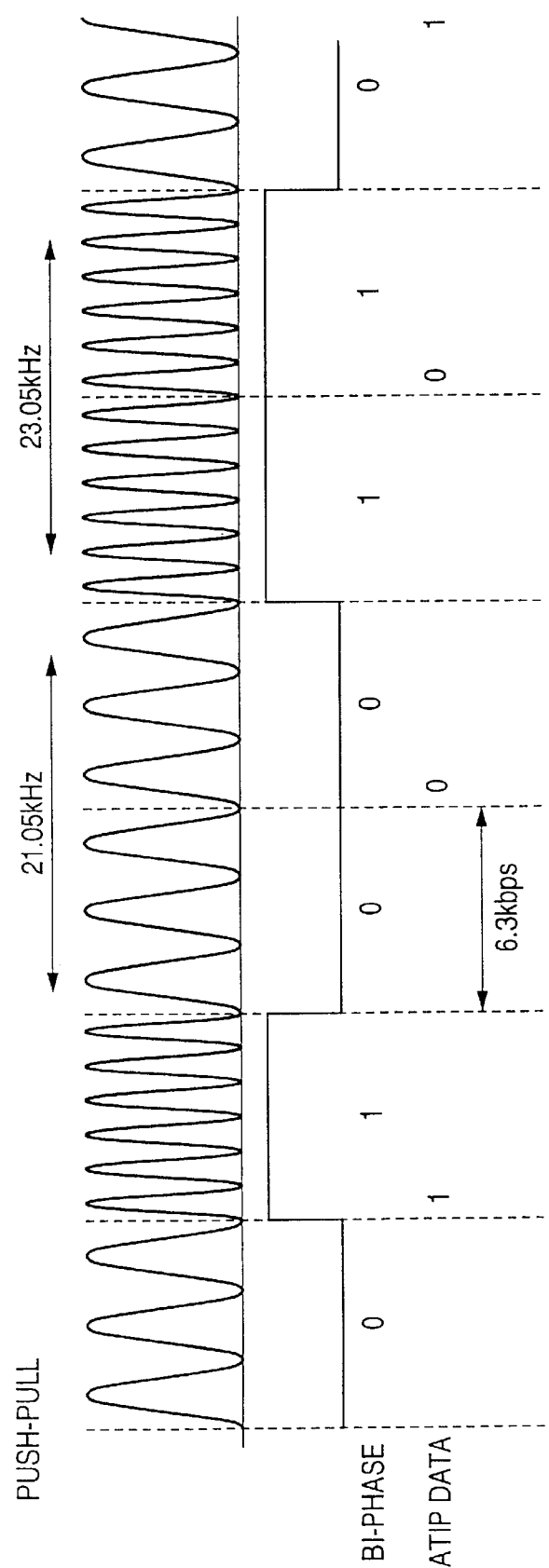
FIG. 8 illustrates an ATIP frame.
Figure 9:
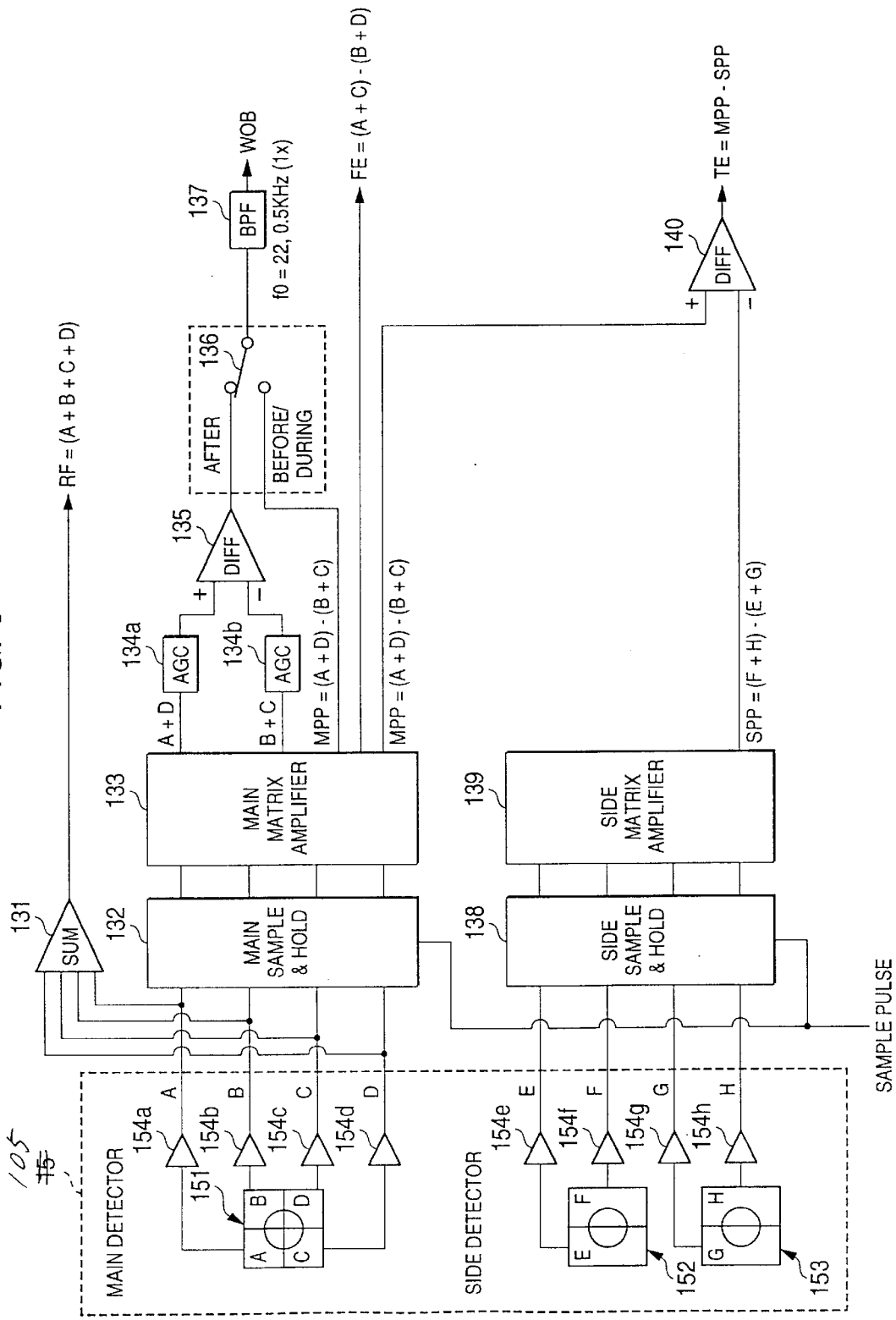
FIG. 9 is a block diagram showing a configuration of an RF amplifier of a conventional disc drive apparatus.
Figure 10B:
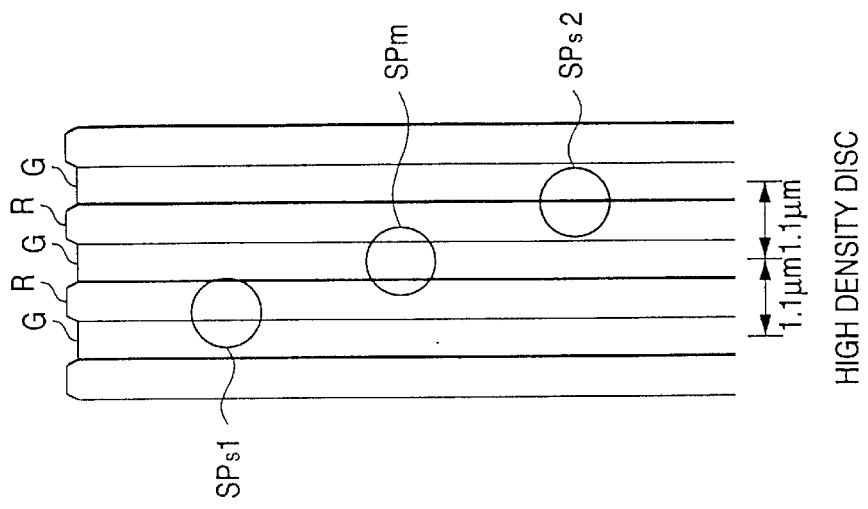
FIGS. 10A and 10B illustrate the relationship between laser spots and track pitches.
Figure 10A:
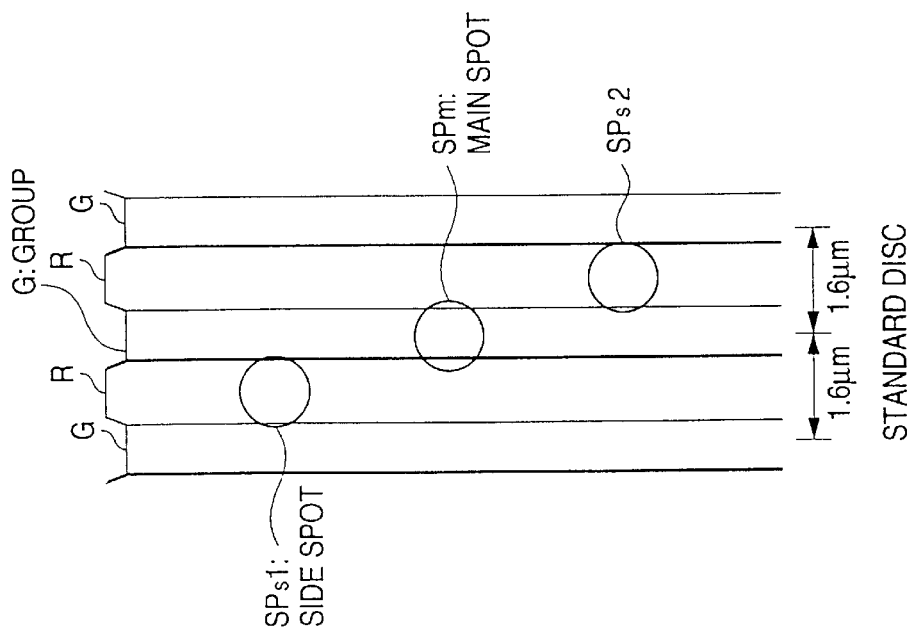

ATIP information is not encoded in wobble information as it is and, as shown in FIG. 8, it is subjected to so-called FSK modulation in which FM modulation is performed after once performing bi-phase modulation. The purpose is to use wobble signals also for rotation control. Specifically, 1s and 0s are switched at each of predetermined periods through bi-phase modulation such that the average numbers of 1s and 0s will be in a 1:1 relationship and such that the average frequency of FM-modulated wobble signals will be 22.05 kHz.

Although not described in detail, other information including information on recording laser power setting and disc types as special information is encoded as wobble information in addition to time information.

A conventional format associated with a normal density and a high density mode in which the range of addresses is increased are available for address information (absolute time information) recorded as wobble information.

Figure 2:
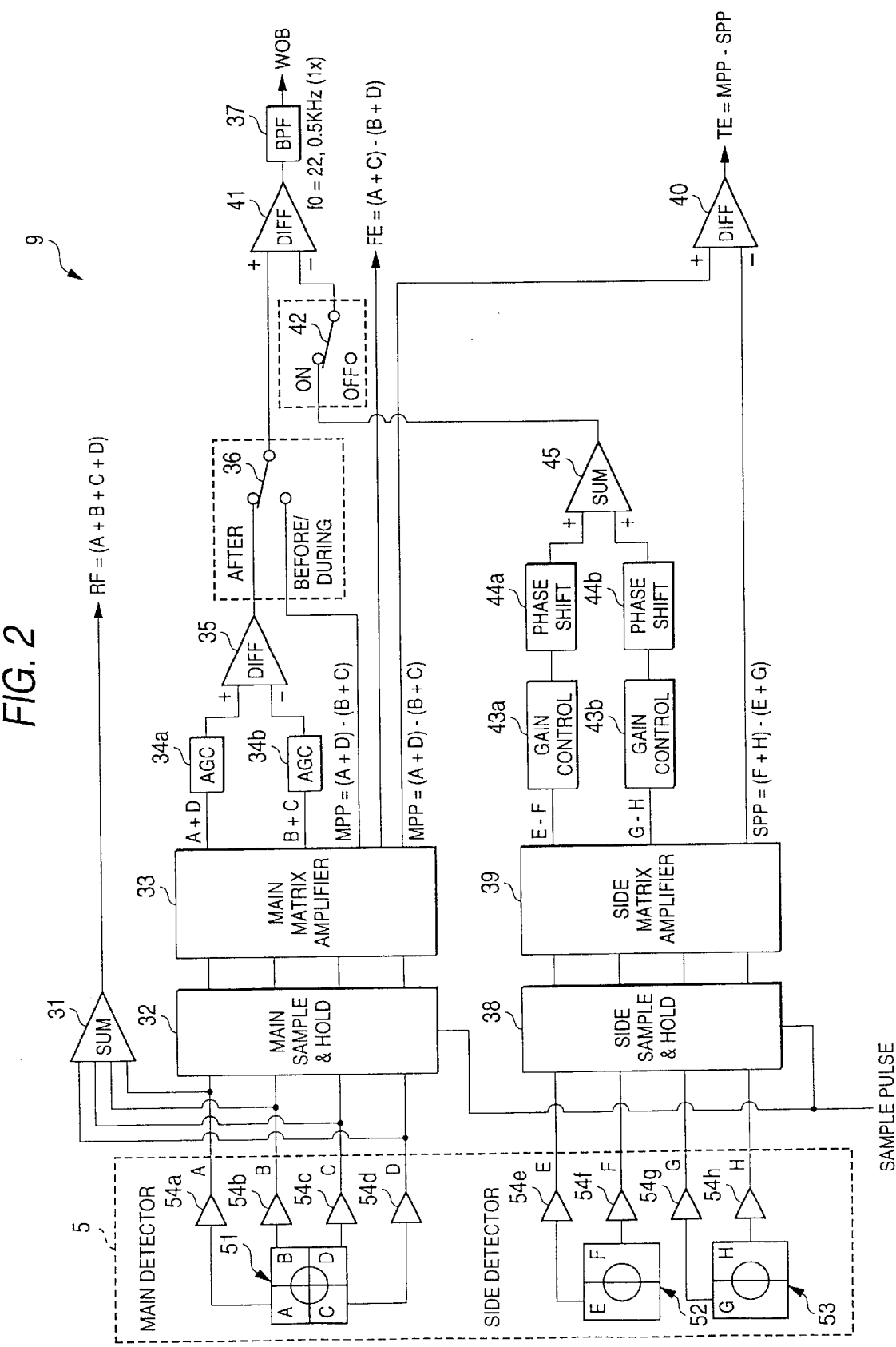
FIG. 2 is a block diagram showing a configuration of an RF amplifier of the disc drive apparatus that is an embodiment of the invention.

FIG. 2 shows a configuration of the RF processing circuit 9 provided in the disc drive apparatus of the present embodiment. A description will be made with reference to FIG. 2 on a method for generating wobble information according to the present embodiment.

The system for controlling tracking servo in the present embodiment is the DPP system, and FIG. 2 shows a configuration of the RF processing circuit 9 associated with the DPP system.

In a disc drive apparatus in which tracking control is performed using a DPP system, the pickup emits a main beam (zero-order light) for scanning a recording track and two side beams (positive first-order light and negative first-order light) separate from the main beam. Thus, a main spot and two side spots are formed on the disc.

Therefore, the pickup as a photo-detector 5 is provided with a main detector 51 that detects information of reflected light from the main spot and two side detectors 52 and 53 for detecting information of reflected light from the two side spots, respectively.

Referring to the actual locations of the detectors of the photo-detector 5, the side detectors 52 and 53 are respectively provided in front of and behind the main detector 51 in the direction of a track. In FIG. 2, however, the side detectors 52 and 53 are shown side by side for better understanding of the circuit configuration.

The main detector 51 is divided by a division line in a direction orthogonal to a track formed on a disc and a division line in parallel with the track into four detection areas A, B, C and D, and information of reflected light from the recording track is detected by the detection areas A, B, C and D. Pieces of information on reflected light detected by the detection areas A through D are converted by respective photoelectric conversion portions 54a, 54b, 54c and 54d into electrical signals A, B, C and D depending on quantities of reflected light and are output to the RF processing circuit 9.

The detection signals A through D from the photoelectric conversion portions 54a through 54d are supplied to an adder 31 and a main sample-and-hold circuit 32 provided in the RF processing circuit 9.

The adder 31 adds the detection signals A through D from the respective photoelectric conversion portions 54a through 54d and outputs a resultant sum signal (A+B+C+D) as an RF signal or reproduction data signal.

For example, the main sample-and-hold circuit 32 samples and holds the detection signals A through D based on sample pulses input thereto during a data recording operation (during recording) and allows the detection signals A through D to pass through without sampling and holding them when data are not being recorded (before and after recording).

Therefore, for example, a sample pulse input to the main sample-and-hold circuit 32 is at a "low" level (hold level) at least for a period T1 in which the laser power (write power) is turned on for writing as shown in FIGS. 3A and 3B. It is at a "high" level (sampling level) only for a period T3 that is included in a reproduction period in which the laser power is off (period T2). The detection signals A through D are sampled within the period T3.

That is, the main sample-and-hold circuit 32 does not sample the detection signals A through D during writing of data in a recording track at which time the intensity of laser light changes significantly.

A main matrix calculation/amplification circuit (main matrix amplifier) 33 performs various arithmetic processes for obtaining, for example, tracking error signals TE, focus error signals FE, wobble information WOB and the like from the signals A through D output by the main sample-and-hold circuit 32.

For example, it performs an arithmetic process (A+D)−(B+C) to obtain a tracking error signal TE and wobble information WOB before and during recording of data in a recording track and outputs the result of calculation as a main push-pull signal MPP.

Further, it performs an arithmetic process (A+C)−(B+D) to obtain a focus error signal FE.

For example, the main matrix amplifier 33 performs arithmetic processes (A+D) and (B+C) to obtain wobble information WOB after recording of data in a recording track and outputs the arithmetic outputs to AGC circuits 34a and 34b, respectively.

A differential amplifier 35 outputs the difference between the output signal (A+D) from the AGC circuit 34a and the output signal (B+C) from the AGC circuit 34b as (A+D)−(B+C). Therefore, the differential amplifier 35 outputs a push-pull signal whose gain has been adjusted by the AGC circuits 34a and 34b.

Switching of a switch 36 is controlled depending on the operating state of the disc drive apparatus.

For example, the switch is controlled such that it is switched between a position after recording of data and a position before and during recording of data, and the output of the differential amplifier 35 is output to a positive phase input terminal (+) of a differential amplifier 40 after recording of data. Before and during recording of data, the main push-pull signal MPP from the main matrix amplifier 33 is output to a positive phase input terminal (+) of the differential amplifier 40.

Specifically, in the RF processing circuit 9 of the present embodiment, the main sample-and-hold circuit 32 outputs the detection signals A through D to the main matrix amplifier 33 without sampling and holding them before recording of data in the recording track.

The main push-pull signal MPP obtained by the sample-and-hold circuit 32 is used as a first push-pull signal for extracting wobble signal components.

During a recording operation for recording data in a recording track, the sample-and-hold circuit 32 samples the detection signals A through D during the reproduction period and outputs them to the main matrix amplifier 33 such that the signals will not be affected by changes in the laser intensity associated with the writing of data in the recording track.

In this case, the main push-pull signal MPP obtained by the main matrix amplifier 33 is again used as a first push-pull signal.

During reproduction or the like after data recording, the main sample-and-hold circuit 32 outputs the detection signals A through D without sampling and holding them. Since the detection signals A through D are signals including beat components, a push-pull signal which has been subjected to gain adjustment at the AGC circuits 34a and 34b to reduce the influence of the beat components is used as a first push-pull signal.

The side detectors 52 and 53 for respectively detecting information of reflected light from two side spots are divided into two detection areas E and F and G and H respectively by division lines in parallel with a track formed on the disc. Pieces of information of reflected light detected by the detection areas E through H are converted by photoelectric conversion portions 54e, 54f, 54g and 54h into respective output signals E, F, G and H which are in turn output to a side sample-and-hold circuit 38 of the RF amplifier.

The side sample-and-hold circuit 38 receives the input of sample pulses similarly to the above-described main sample-and-hold circuit 32. For example, it samples and holds the detection signals E through H based on the sample pulses during recording of data and allows the detection signals E through H to pass through without sampling and holding them when data are not being recorded (before and after recording).

A side matrix amplifier 39 performs an arithmetic process (F+H)−(E+G) to obtain a tracking error signal TE from the output signals E through H of the side sample-and-hold circuit 38 and outputs the arithmetic result to a differential amplifier 40 as a side push-pull signal SPP.

The differential amplifier 40 obtains a differential signal (MPP-SPP) from the main push-pull signal MPP from the main matrix amplifier 33 and the side push-pull signal SPP from the side matrix amplifier 39 and outputs the same as a tracking error signal TE.

Such an RF processing circuit 9 of the present embodiment can cancel any crosstalk component included in wobble component signals in a recording track, for example, when the disc loaded therein is a high density disc.

Therefore, the side matrix amplifier 39 is added with an arithmetic function to obtain a second push-pull signal (E−F) from the detection signals E and F from the side detector 52 and an arithmetic function to obtain a third push-pull signal (G−H) from the detection signals G and H from the side detector 53 in addition to the above-described arithmetic function to obtain the side push-pull signal SPP from the detection signals E through H. The side matrix amplifier 39 obtains wobble components from tracks adjacent to a recording track on both sides thereof.

The second and third push-pull signals (E−F) and (G−H) output by the side matrix amplifier 39 are output to gain control circuits 43*a* and 43*b*, respectively.

The gain control circuits 43*a* and 43*b* adjust the gain of the second and third push-pull signals (E−F) and (G−H) such that the levels of the second and third push-pull signals (E−F) and (G−H) coincide with the level of the first push-pull signal obtained from the detection signals A through D from the main detector 51 and output them to phase shift circuits 44*a* and 44*b*, respectively.

The gain of the gain control circuits 43*a* and 43*b* is set in advance such that crosstalk components included in the first push-pull signal can be most effectively canceled.

The phase shift circuits 44*a* and 44*b* adjust phase differences that are generated by physical position differences between a main spot SPm detected by the main detector 51 and two side spots SPs1 and SPs2 detected by the side detectors 52 and 53.

For example, when the side spot SPs1 leads the main spot SPm, they delay the phase of the second push-pull signal (E−F) obtained from the side spot SPs1 that is leading, and they advance the phase of the third push-pull signal (G−H) obtained from the side spot SPs2 that is delayed from the main spot SPm. As a result, the phase of the first push-pull signal obtained by the main detector 51 coincides with the phases of the second and third push-pull signals obtained by the side detectors 52 and 53.

The phase shift circuits 44*a* and 44*b* are configured to allow the quantities of phase shift to be varied in accordance with the reproduction speed of a disc when the disc reproduction speed can be varied.

It is not essential to provide the phase shift circuits 44*a* and 44*b*.

FIG. 4 shows an example of a phase shift circuit.

The phase shift circuit shown in FIG. 4 is constituted by a series circuit of a phase delay portion 46 for delaying the phase of a signal input thereto, for example, within the range of −90±30°, a phase advance portion 47 for advancing the phase of a signal input thereto +90° and a non-inverting amplifier 65.

In this case, the phase delay portion 46 is formed by parallel-connecting a series circuit formed of a non-inverting amplifier 61 and a capacitor C1 and a series circuit of an inverting amplifier 62 and a variable resistor R1.

The phase advance portion 47 is formed by parallel-connecting a series circuit of a non-inverting amplifier 63 and a resistor R2 and a series circuit of an inverting amplifier 64 and a capacitor C2.

After the phase adjustment at the phase shift circuits 44*a* and 44*b*, the second and third push-pull signals are added by the adder 45. As a result, the adder 45 outputs a signal that is the sum of wobble components in the adjacent tracks on both sides of the recording track or a signal associated with crosstalk components included in the first push-pull signal from the recording track. This signal is input to a negative phase input terminal (−) of a differential amplifier 41 through an ON terminal of a switch 42.

The position of the switch 42 is controlled depending on the density type of a disc determined by a system controller 10. For example, the switch is controlled such that it is switched to the On terminal when a loaded disc has a high density and to an OFF terminal when the disc has a normal density. The OFF terminal of the switch 42 is an open end.

The differential amplifier 41 is inserted between the switch 36 and a BPF 37, and it outputs a signal that is the difference between a signal input through the switch 36 and a signal input through the switch 42.

The BPF 137 is a band-pass filter that allows wobble components having a central frequency of 22.05 kHz to pass through to eliminate other unnecessary frequency components. It extracts wobble components included in the push-pull signal input through the switch 36 to output wobble information WOB.

As thus described, the switch 42 of the RF processing circuit 9 of the present embodiment is connected to the ON terminal when a standard disc is loaded, and the first push-pull signal input from the differential amplifier 41 through the switch 36 is output as it is. Specifically, since the first push-pull signal does not include any crosstalk component from adjacent tracks, the BPF 37 extracts wobble components included in the first push-pull signal to obtain wobble information WOB in this case.

On the contrary, when a high density disc is loaded, the switch 41 is connected to the ON terminal to output a signal that is the difference between a first push-pull signal input from the differential amplifier 41 through the switch 36 and crosstalk components input through the switch 42. That is, wobble information WOB is obtained by eliminating unnecessary frequency components from the differential signal between the first push-pull signal including crosstalk components and the crosstalk component signals obtained from the second and third push-pull signals at the BPF 37.

It is therefore possible to obtain wobble information WOB that is free from any influence of crosstalk from adjacent tracks even in the case of recording or reproduction of a high density disc, which makes it possible to reduce jitter components in wobble information.

That is, the present embodiment makes it possible to extract wobble information from a high density disc without any change in the specification of an optical system.

Figure 5:
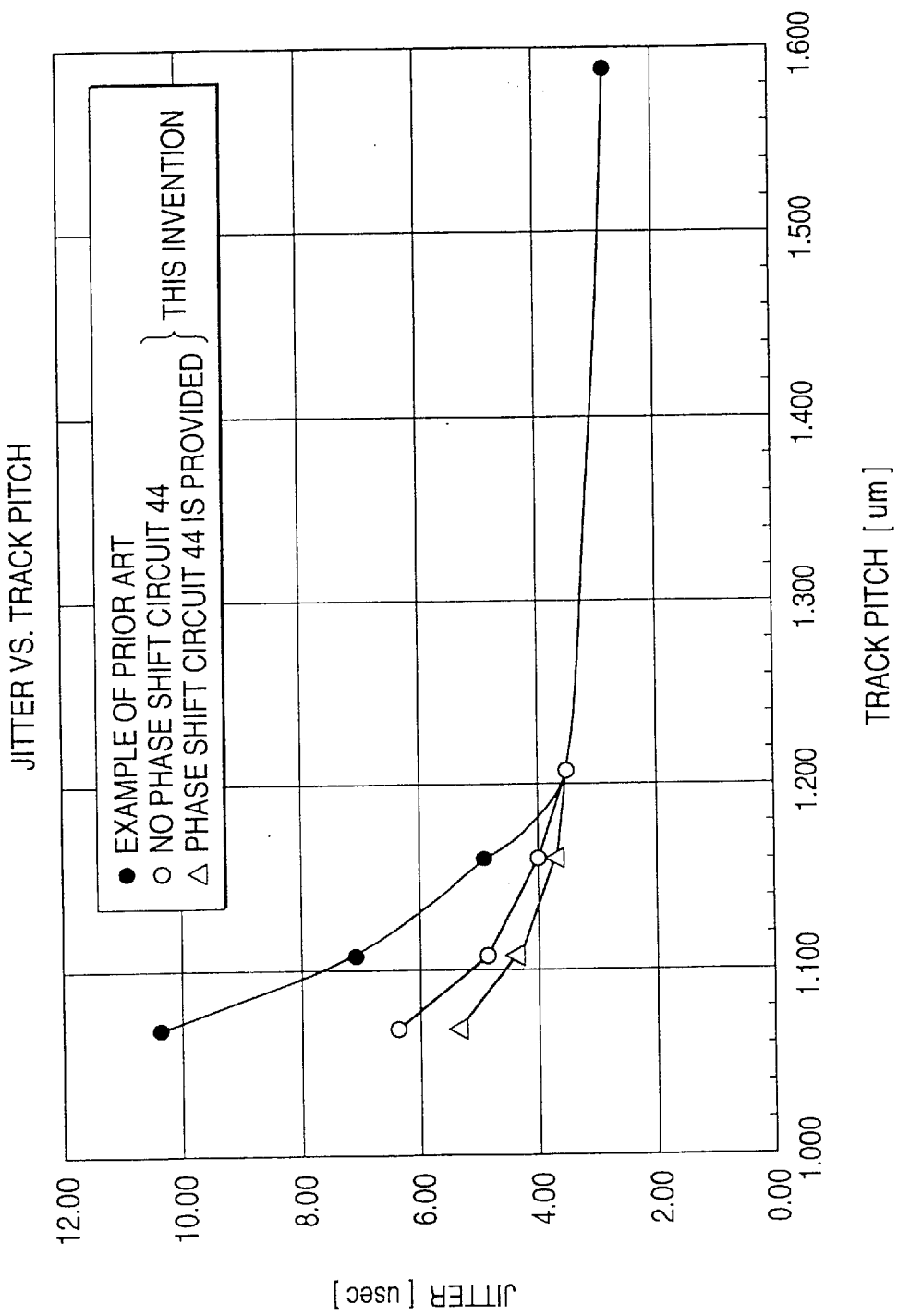
FIG. 5 is a graph showing the relationship between track pitches and jitter components included in wobble information.

FIG. 5 is a graph showing the relationship between track pitches and jitter components included in wobble information.

FIG. 5 shows the relationship between track pitches and jitter components in an RF processing circuit 9 having the configuration shown in FIG. 2 using symbols "Δ".

Symbols "○" indicate the relationship between track pitches and jitter components when the phase shift circuits 44*a* and 44*b* are removed from the RF processing circuit 9.

Symbols "●" indicate the relationship between track pitches and jitter components in a conventional RF processing circuit for a comparison with the present embodiment.

FIG. 5 shows that jitter components included in wobble information abruptly increase in the conventional RF processing circuit as indicated by "●", for example, when the loaded disc has a track pitch smaller than 1.2 $\mu$m, i.e., when the loaded disc is a high density disc and that jitter components included in wobble information are suppressed in the RF processing circuit 9 of the present embodiment as indicated by "Δ" and "○" even in the case of a high density disc.

As thus described, according to the present embodiment, the second and third push-pull signals (E–F) and (G–H) are calculated from information of reflected light from two side beams (leading and following beams) detected by the side detectors 52 and 53, and cross talk component signals are obtained by adding the second and third push-pull signals.

The crosstalk component signals are subtracted from the first push-pull signal (a wobble component signal from the recording track including cross talk components) obtained from information of reflected light of a main beam scanning the recording track, and it is therefore possible to reliably eliminate crosstalk component signals included in the first push-pull signal.

Further, crosstalk component signals are subtracted from a first push-pull signal calculated by the main matrix amplifier 33. Therefore, while it has conventionally been required to provide an accurate delay circuit to eliminate crosstalk components, for example, in a band including RF signal components which have not been subjected to the arithmetic process at the main matrix amplifier 33, the present embodiment makes it possible to achieve the same object only by providing relatively simple phase shift circuits.

Further, the first through third push-pull signals are obtained without sampling and holding the detection signals A through H before recording data for which the laser intensity changes less significantly or during reproduction of recorded data.

During a recording operation for recording data in a recording track, the detection signals A through H are sampled and held to obtain the first through third push-pull signals during a reproduction period when no data is being written in the recording track.

This makes it possible to extract accurate wobble information in any operating state.

Furthermore, according to the present embodiment, the type of a disc is determined and crosstalk component signals are eliminated from the first push-pull signal with the switch 38, for example, when the disc is a high density disc having a small track pitch, and cross talk components are not eliminated, for example, when the disc is a standard disc having a normal track pitch. It is therefore possible to provide a disc drive apparatus which can be adapted to a disc type.

While the present embodiment has been described with reference to an example of a method for generating wobble information in a signal processing circuit (RF amplifier) that employs a DPP system as a system for controlling tracking servo, the present invention is not limited to DPP type signal processing circuits and may be applied to various signal processing circuits that employ a three-spot system, for example.

As described above, according to the present invention, crosstalk components generated by second and third push-pull signals obtained from reflected light from two side spots of laser light are eliminated from a first push-pull signal including wobble components obtained from reflected light from a main spot, which makes it possible to reduce jitter components included in wobble information.

It is therefore possible to reduce jitter components included in address information during decoding of wobble information, for example, even when a high density disc is loaded, which makes it possible to achieve stable recording and reproducing operations.

This also makes it possible to achieve preferable recording and reproducing operations on a high density disc even if the disc drive apparatus has optical system specifications adapted to standard discs.

According to the invention, there is provided a sample-and-hold circuit for sampling and holding information of reflected light for obtaining the first, second and third push-pull signals and arithmetic circuits for performing predetermined arithmetic processes. During a recording operation to record data on a disc recording medium, information of reflected light is sampled and held, for example, in a reproduction period when no data is being written.

This makes it possible to prevent the first through third push-pull signals from being affected by changes in laser density associated with writing of data in a recording track.

Before recording of data on a disc recording medium or during reproduction after recording, predetermined arithmetic processes are performed by the respective arithmetic circuits without sampling and holding the information of reflected light at the sample-and-hold circuit. During reproduction of data, the arithmetic circuits perform predetermined calculations, and the gain control circuit performs gain control to obtain the first push-pull signal. It is therefore possible to reduce the influence of beat components included in information of reflected light.

Crosstalk component signal generating means adds a matrix calculation circuit that is provided in advance with a function of calculating the second and third push-pull signals, which allows a simple configuration constituted by a gain adjusting circuit for generating crosstalk components from the second and third push-pull signals and an addition circuit.

Further, by providing the crosstalk component signal generating means with phase shift circuits for matching the phases of the second and third push-pull signals with the phase of the first push-pull signal, jitter components included in address information can be reduced more significantly, which allows recording and reproducing operations with improved stability.

By employing a configuration in which the gain of the gain adjusting circuit is set in advance in accordance with the track pitch of a disc recording medium and in which the quantities of phase changes in the phase shift circuits can be varied in accordance with the reproduction speed of the disc recording medium, the invention can be applied to various disc drive apparatuses.

Further, determination means for determining the type of a recording medium loaded in the apparatus may be provided to generate and output wobble information using a signal obtained by canceling crosstalk component signals in wobble component signals when the disc is a first disc type (e.g. a high density disc) and to generate and output wobble information using the wobble component signals when the disc is determined to be a second disc type (standard disc). This makes it possible to adapt the disc drive apparatus to plural types of discs.

What is claimed is:

1. A disc drive apparatus capable of recording or reproducing a disc recording medium on which recording tracks are formed using grooves, comprising:

light detecting means capable of obtaining a first push-pull signal from reflected light from a main spot of laser light and obtaining second and third push-pull signals from reflected light from two side spots of the laser light;

a wobble component signal extractor for extracting wobble component signals in a recording track under a scan using the first push-pull signal;

a crosstalk component signal generator for generating crosstalk component signals from adjacent tracks on both sides of the recording track using the second and third push-pull signals; and a wobble information output unit for generating wobble information of the recording track from signals obtained by canceling the crosstalk component signals in the wobble component signals and for outputting the wobble information.

2. The disc drive apparatus according to claim 1, comprising:

a sample-and-hold circuit capable of sampling and holding the information of reflected light for obtaining the first push-pull signal and the second and third push-pull signals at predetermined timing; and an arithmetic circuit for performing an arithmetic process for obtaining the first push-pull signal and the second and third push-pull signals.

3. The disc drive apparatus according to claim 2, wherein the sample-and-hold circuit samples and holds the information of reflected light during a recording operation for recording data on the disc recording medium.

4. The disc drive apparatus according to claim 2, wherein a predetermined arithmetic process is performed by the arithmetic circuit without sampling and holding the information of reflected light with the sample-and-hold circuit when no data is recorded on the disc recording medium.

5. The disc drive apparatus according to claim 2, further comprising a gain control circuit, wherein the sample-and-hold circuit does not sample and hold the information of reflected light; the arithmetic circuit performs a predetermined arithmetic process; and the gain control circuit controls performs gain control to obtain the first push-pull signal during data reproduction for reproducing data from the disc recording medium.

6. The disc drive apparatus according to claim 1, wherein the crosstalk component signal generator comprises:

a matrix calculation circuit for calculating at least the second and third push-pull signals;

a gain adjusting circuit for adjusting the gain of the second and third push-pull signals; and an addition circuit for adding the second and third push-pull signals which have been subjected to gain adjustment at the gain adjusting circuit.

7. The disc drive apparatus according to claim 6, wherein the crosstalk component signal generator comprises a phase shift circuit for shifting the phases of the second and third push-pull signals such that they coincide with the phase of the first push-pull signal.

8. The disc drive apparatus according to claim 7, wherein the phase shift circuit is configured to be capable of changing the quantity of a phase shift according to the reproduction speed of the disc recording medium.

9. The disc drive apparatus according to claim 6, wherein the gain of the gain adjusting circuit is set in accordance with the pitch of recording tracks of the disc recording medium.

10. The disc drive apparatus according to claim 1, wherein the light detecting means irradiates the disc recording medium with main laser light, first side laser light for forming a first side spot before a main spot formed on the disc recording medium by the main laser light and second side laser light for forming a second side spot behind the same.

11. A disc drive apparatus capable of recording or reproducing a disc recording medium on which recording tracks are formed in advance using wobbling grooves, comprising:

light detecting means having a main detector for irradiating a disc recording medium with main laser light emitted toward a recording track on the disc recording medium, first side laser light for forming a first side spot before a main spot formed on the disc recording medium by the main laser light and second side laser light for forming a second side spot behind the same and having first and second sub-detectors for respectively receiving reflected light of the first and second side laser light from the disc recording medium;

a first arithmetic process circuit for performing an arithmetic process to obtain a first push-pull signal based on detection output from the main detector;

a second arithmetic process circuit for performing an arithmetic process to obtain second and third push-pull signals based on detection output from the first and second sub-detectors;

a wobble component signal extractor for extracting wobble component signals in a recording track under a scan using the first push-pull signal;

a crosstalk component signal generator for generating crosstalk component signals from adjacent tracks on both sides of the recording track from the second and third push-pull signals; and a wobble information output unit for generating wobble information of the recording track from signals obtained by canceling the crosstalk component signals in the wobble component signals and for outputting the wobble information.

12. The disc drive apparatus according to claim 11, comprising:

a sample-and-hold circuit capable of sampling and holding the information of reflected light for obtaining the first push-pull signal and the second and third push-pull signals at predetermined timing.

13. The disc drive apparatus according to claim 12, wherein the sample-and-hold circuit samples and holds the information of reflected light during a recording operation for recording data on the disc recording medium.

14. The disc drive apparatus according to claim 12, wherein a predetermined arithmetic process is performed by the arithmetic circuit without sampling and holding the information of reflected light with the sample-and-hold circuit when no data is recorded on the disc recording medium.

15. The disc drive apparatus according to claim 12, further comprising a gain control circuit, wherein the sample-and-hold circuit does not sample and hold the information of reflected light; the arithmetic circuit performs a predetermined arithmetic process; and the gain control circuit controls performs gain control to obtain the first push-pull signal during data reproduction for reproducing data from the disc recording medium.

16. The disc drive apparatus according to claim 11, wherein the crosstalk component signal generator comprises:

a matrix calculation circuit for calculating at least the second and third push-pull signals;

a gain adjusting circuit for adjusting the gain of the second and third push-pull signals; and an addition circuit for adding the second and third push-pull signals which have been subjected to gain adjustment at the gain adjusting circuit.

17. The disc drive apparatus according to claim 16, wherein the crosstalk component signal generator comprises a phase shift circuit for shifting the phases of the second and third push-pull signals such that they coincide with the phase of the first push-pull signal.

18. The disc drive apparatus according to claim 17, wherein the phase shift circuit is configured to be capable of changing the quantity of a phase shift according to the reproduction speed of the disc recording medium.

19. The disc drive apparatus according to claim 16, wherein the gain of the gain adjusting circuit is set in accordance with the pitch of recording tracks of the disc recording medium.

20. The disc drive apparatus according to claim 11, further comprising a detector for determining the type of a disc recording medium loaded, wherein the wobble information generates the wobble information output unit using signals obtained by canceling the crosstalk component signals in the wobble component signals and outputs the same when the detector determines a first disc type and generates the wobble information using the wobble component signals and outputs the same when the detector determines a second disc type.

21. A method for generating wobble information from a disc recording medium on which recording tracks are formed using grooves, comprising the steps of:
  extracting wobble component signals in a recording track under a scan using a first push-pull signal obtained from reflected light from a main spot of laser light;
  generating crosstalk component signals from adjacent tracks on both sides of the recording track using second and third push-pull signals obtained from reflected light from two side spots of the laser light; and
  generating wobble information of the recording track from signals obtained by canceling the crosstalk component signals in the wobble component signals.

* * * * *

UNITED STATES PATENT AND TRADEMARK OFFICE
CERTIFICATE OF CORRECTION

PATENT NO. : 6,594,210 B2  Page 1 of 1
DATED : July 15, 2003
INVENTOR(S) : Eiji Kumagai It is certified that error appears in the above-identified patent and that said Letters Patent is hereby corrected as shown below:

<u>Title page,</u>
Item [57], ABSTRACT,
Line 2, replace "and respected reflected" with -- and respective reflected --.

<u>Column 17,</u>
Line 44, replace "signals which have" with -- signals that have --.

<u>Column 18,</u>
Line 63, replace "signals which have" with -- signals that have --.

Signed and Sealed this

Ninth Day of December, 2003

JAMES E. ROGAN
*Director of the United States Patent and Trademark Office*